(12) United States Patent
Giachino et al.

(10) Patent No.: US 11,905,872 B2
(45) Date of Patent: Feb. 20, 2024

(54) TANK FOR UREA SOLUTION OF A VEHICLE

(71) Applicant: ERRECINQUE S.R.L., Mappano (IT)

(72) Inventors: Massimo Giachino, Mappano (IT); Fabrizio Ciccarelli, Mappano (IT)

(73) Assignee: ERRECINQUE S.R.L., Mappano (IT)

( * ) Notice: Subject to any disclaimer, the term of this patent is extended or adjusted under 35 U.S.C. 154(b) by 2 days.

(21) Appl. No.: 16/968,266

(22) PCT Filed: Feb. 20, 2019

(86) PCT No.: PCT/IB2019/051385
§ 371 (c)(1),
(2) Date: Aug. 7, 2020

(87) PCT Pub. No.: WO2019/162855
PCT Pub. Date: Aug. 29, 2019

(65) Prior Publication Data
US 2021/0033014 A1    Feb. 4, 2021

(30) Foreign Application Priority Data
Feb. 20, 2018  (IT) .......................... 102018000002868

(51) Int. Cl.
*F01N 3/20*    (2006.01)
(52) U.S. Cl.
CPC ........ *F01N 3/2066* (2013.01); *F01N 2610/02* (2013.01); *F01N 2610/105* (2013.01); *F01N 2610/1406* (2013.01); *F01N 2610/1486* (2013.01); *F01N 2900/1811* (2013.01); *F01N 2900/1814* (2013.01)

(58) Field of Classification Search
CPC ............. F01N 2610/02; F01N 2610/10; F01N 2610/105; F01N 2610/1406; F01N 2610/1486; F01N 2900/1811; F01N 2900/1814; F01N 3/206; F01N 3/2066; Y02A 50/20
See application file for complete search history.

(56) References Cited

U.S. PATENT DOCUMENTS

| | | | | |
|---|---|---|---|---|
| 2013/0055701 | A1* | 3/2013 | Yan | F01N 3/208 60/287 |
| 2016/0243000 | A1* | 8/2016 | Gray | A61J 1/165 |
| 2019/0041105 | A1* | 2/2019 | Yin | F25B 21/02 |

FOREIGN PATENT DOCUMENTS

| | | | |
|---|---|---|---|
| CN | 205086671 | * | 3/2016 |
| CN | 205086671 U | | 3/2016 |
| EP | 3 078 823 | | 10/2016 |

(Continued)

OTHER PUBLICATIONS

European Search Report in EP Application No. 19712029.8-1004, dated Nov. 29, 2022 (3 pages).

*Primary Examiner* — Phutthiwat Wongwian
*Assistant Examiner* — Diem T Tran
(74) *Attorney, Agent, or Firm* — Leason Ellis LLP

(57) ABSTRACT

Tank for a vehicle comprising at least one wall defining a closed volume configured to contain an urea solution, and conditioning means configured to maintain the urea solution within a preset temperature range between a maximum threshold and a minimum threshold, the conditioning means generating a heat flow suitable to maintain the urea solution within the aforementioned range by converting an electric power supply of the conditioning means.

12 Claims, 3 Drawing Sheets

(56) References Cited

FOREIGN PATENT DOCUMENTS

| | | |
|---|---:|---:|
| EP | 3 165 732 | 5/2017 |
| WO | WO-9949957 | * 10/1999 |
| WO | WO 2004/103529 | 12/2004 |

* cited by examiner

TANK FOR UREA SOLUTION OF A VEHICLE

CROSS-REFERENCE TO RELATED APPLICATIONS

This patent application is a U.S. National Phase Application under 35 U.S.C. § 371 of International Patent Application No. PCT/IB2019/051385, filed on Feb. 20, 2019, which claims priority from Italian Patent Application No. 102018000002868 filed on Feb. 20, 2018, all of which are incorporated by reference, as if expressly set forth in their respective entireties herein.

TECHNICAL FIELD

The present invention relates to a tank of a heavy vehicle, in particular to a tank for urea solution usable by a control system of the emissions of a diesel engine of a heavy vehicle.

To reduce emissions of pollutants from diesel engines, it is known to use an emission reduction technique known as "selective catalytic reduction" or SCR. This technique is based on the injection into the exhaust gas flow of a urea-based solution which, through a chemical reaction, transforms the nitrogen oxides into nitrogen and water in gaseous elementary form, significantly reducing the level of pollutants of the diesel engine. This urea solution, normally known as ADBLUE®, is normally contained in a dedicated tank of the vehicle.

The urea solution is conveyed into the exhaust gas flow by means of a distribution circuit and, in order to control the temperature of the urea solution, it is kept at a controlled temperature level by means of a conditioning circuit.

BACKGROUND ART

In fact, for this reaction to be effective, it is known that the urea solution must have a temperature between −11° C. and 67° C., namely respectively, the urea freezing temperature and the urea chemical disintegration temperature.

The tank containing the urea solution is arranged outdoors, in direct contact with the atmospheric agents, especially air and sun, and therefore is subjected to considerable temperature changes.

In order to allow the taking of the urea solution, it is known to use urea intake units partially inserted in the tanks and connected to the cooling circuit of the engine of the vehicle. In this way, the intake units are configured to heat the urea solution contained in the tank, for example during the winter period, to prevent the solution from freezing by using the recirculation of the engine cooling liquid inside the intake units.

During the summer period or in situations where the tank is exposed to sunlight for a long time, the urea solution can heat up, thus exceeding the aforementioned threshold of 67° C.

The aforementioned intake units cannot be used to cool the urea solution, which may risk exceeding the aforementioned threshold even for a short period, thus degrading and jeopardizing its effectiveness in the chemical process of abatement of pollutants.

It is therefore felt a need to maintain the tank for urea solution within a preset temperature range in order to prevent the chemical degradation of the urea contained inside it.

DISCLOSURE OF INVENTION

The object of the present invention is to solve the technical problem described above in a simple and inexpensive manner.

The above purpose is achieved by means of a tank for urea solution according to claim 1.

BRIEF DESCRIPTION OF THE DRAWINGS

For a better understanding of the present invention, a preferred embodiment is described below, by way of non-limiting example and with reference to the attached drawings, in which.

BEST MODE FOR CARRYING OUT THE INVENTION

Figure 1:
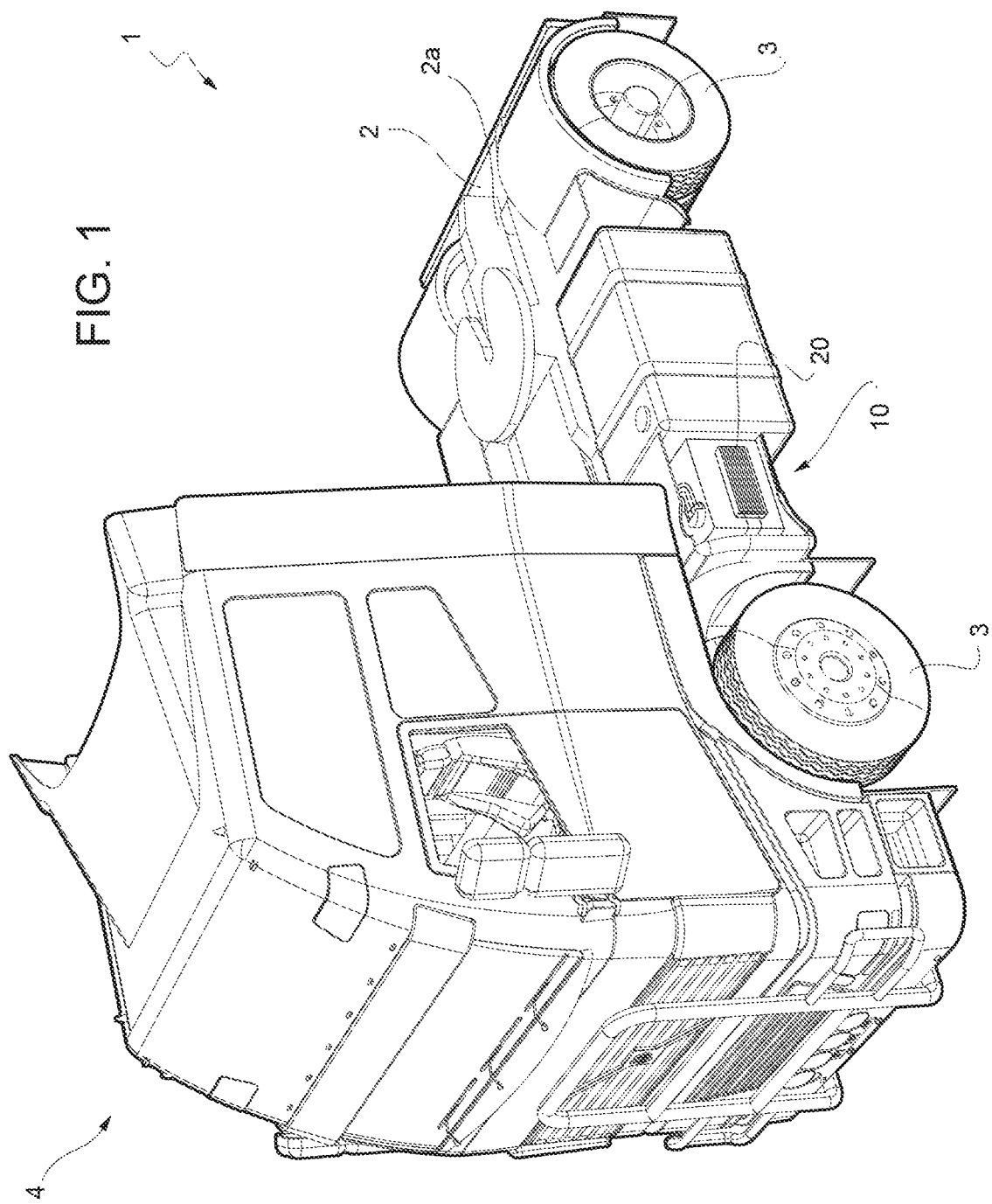
FIG. 1 is a perspective view of an industrial vehicle that comprises a tank for urea solution according to the invention.

In FIG. 1, the reference number 1 indicates a heavy vehicle of a known type, in particular a diesel engine truck. However, it is clear that this example is described purely by way of example and that the tank of the present invention can be used in any field/vehicle.

The vehicle 1 can comprise a frame 2 mounted on at least one pair of wheels 3 and designed to support a front portion 4 comprising for example the driver's cab of the vehicle 1 and an engine (not shown) and to define a support area 2a for a trailer or a load to be transported.

The vehicle 1 comprises a tank 10 carried by the frame 2 and configured to house a urea solution adapted to be used by an emission control system (not shown) of the engine of the vehicle 1.

Figure 2:
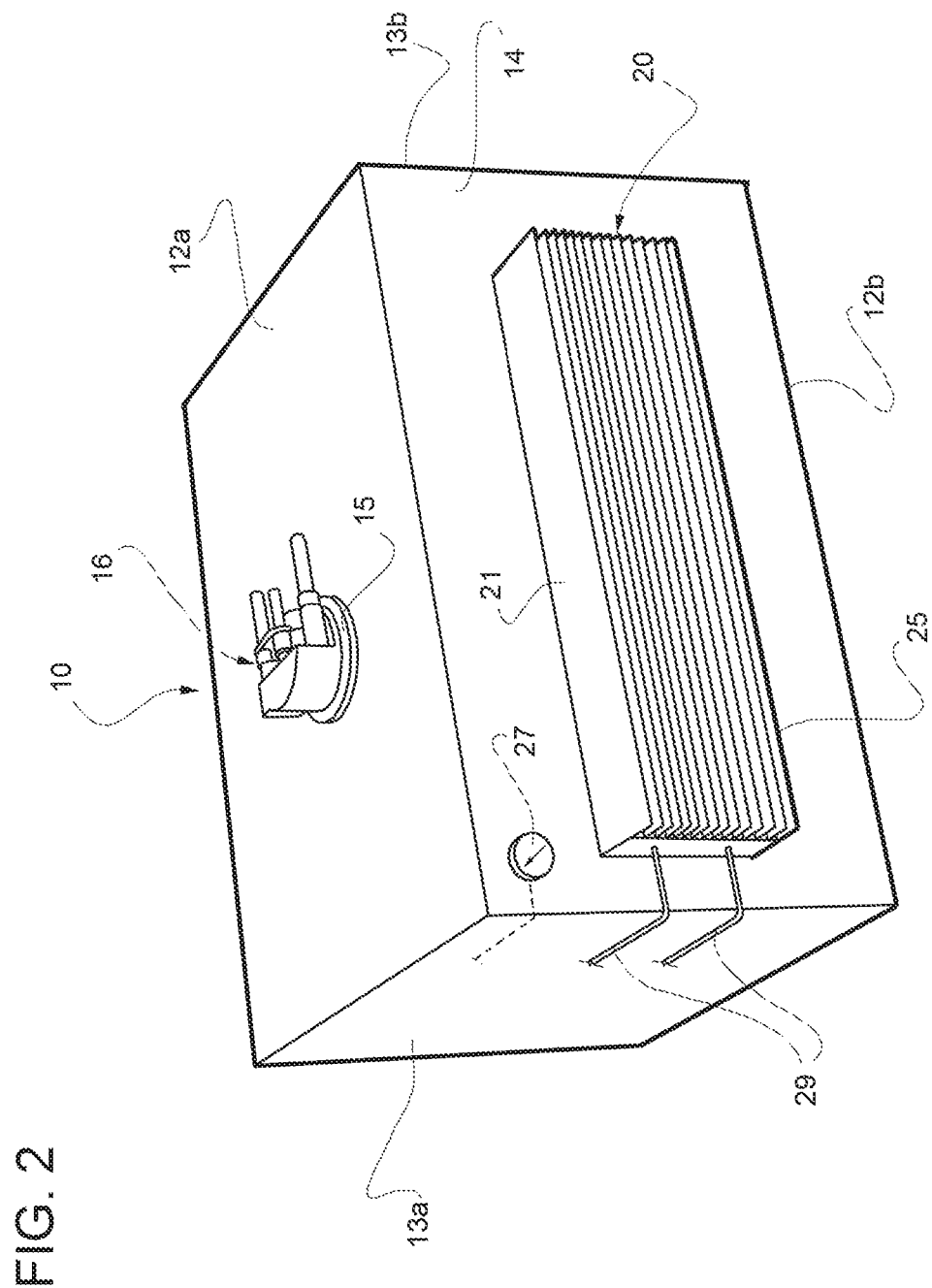
FIG. 2 is a schematic perspective view on an enlarged scale of the tank of FIG. 1.

As shown in FIG. 2, the tank 10 comprises at least one outer wall defining inside it an internal volume 11 configured for storing the urea solution. Preferably, the tank 10 has a substantially parallelepiped shape and comprises a pair of respectively upper and lower walls 12a, 12b, a pair of respectively front and rear walls 13a, 13b and a pair of side walls 14. The parts 12, 13 and 14 can be made of polymeric or metallic material.

The tank 10 comprises at least one light 15 configured to allow the collection and filling of the urea solution. Advantageously, the light 15 allows housing a urea intake unit 16 of a known type configured to allow simultaneously the intake/filling of the urea solution and the heating of the same in a known way, through a fluidic connection with a cooling circuit of the engine of the vehicle 1.

According to the present invention, the tank 10 comprises a conditioning device 20 configured to maintain the urea solution within a preset temperature range between a minimum and a maximum temperature threshold, in particular to maintain the urea solution below a maximum temperature threshold, as better described hereinafter.

The conditioning device 20 is an electrically powered device that generates a heat flow configured to cool the urea solution. In particular, the conditioning device 20 can comprise at least one Peltier cell 21 fastened, for example, to one of the walls of the tank 10. In the described case there is a single Peltier cell 21 having a substantially rectangular shape fastened to one of the side walls 14 of the tank 10.

Figure 3:
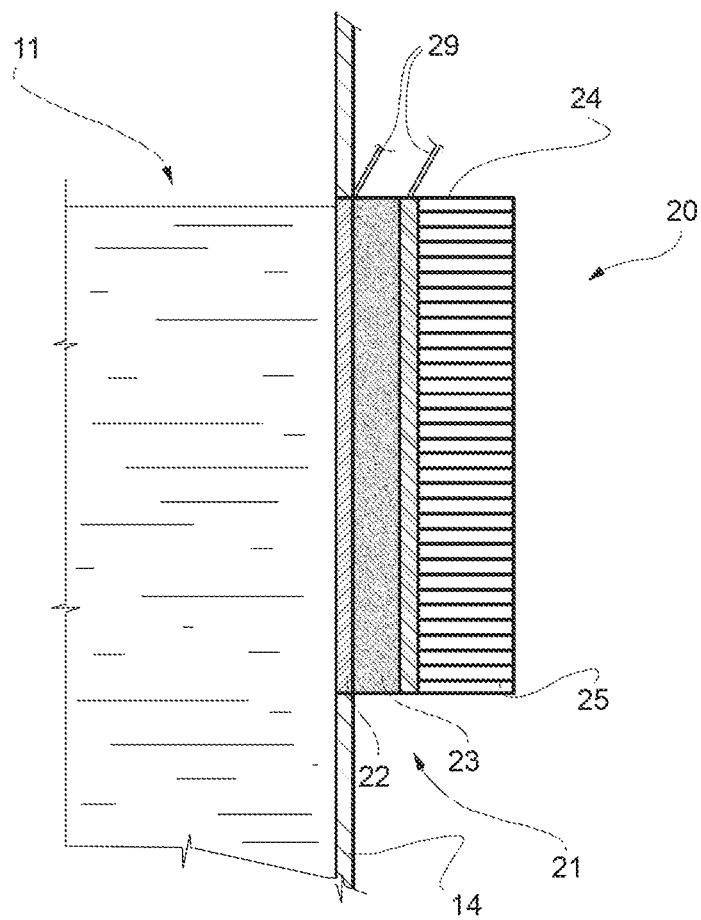
FIG. 3 is a schematic sectional view of a portion of the tank of FIG. 2.

As schematically shown in FIG. 3, the Peltier cell 21 essentially comprises a first wall 22 made of conductive material, a thermoelectric connection layer 22 of known type and a second wall 24 made of conductive material.

Preferably, the first wall 22 is arranged inside the side wall 14 of the tank 10 in direct contact with the urea solution. Advantageously, if the tank 10 were made of plastic material, this first wall 22 could be co-moulded to the side wall 14.

The second wall 24 is arranged on the opposite side of the thermoelectric connection material 22 so that this material is sandwiched between the first and the second wall 22, 24. Advantageously, the Peltier cell 21 is electrically powered so that the first plate 22 cools and the plate 24 consequently heats up, or vice versa.

The Peltier cell 21 can also be provided with a heat dissipation device 25 connected to the second wall 24 and configured to avoid excessive heating and dissipate the heat into the environment. The heat dissipation device 25 can conveniently comprise a finned exchanger fastened to the second wall 24. The Peltier cell 21 can be further provided with ventilation means (not shown), for example a fan, configured to increase the efficiency of the heat dissipation device 25.

The tank 10 can further comprise a sensor 27 configured to measure a physical quantity of the urea solution and send this measurement to a control unit (not shown) of the conditioning device 20. This control unit is configured to activate the conditioning device 20 based on the value measured by the sensor 27.

Preferably, this sensor 27 is a temperature sensor and the control unit is the central control unit of the vehicle 1. Advantageously, the conditioning device can be activated when the sensor measures a temperature of the urea solution higher than the maximum threshold temperature comprised between 40° C. and 55° C., preferably between 45° C. and 50° C., for example 48° C. Moreover, the device can be activated when the sensor measures a urea solution temperature lower than a minimum threshold, preferably lower than 10° C., for example 5° C.

The conditioning device 20 requires an electric power supply at 12 or 24 V, for example through the battery of the vehicle, or through an autonomous battery. This electric power supply is supplied to the conditioning device via electrical connections, e.g. a pair of electric wires 29 configured to connect each of the plates 22, 24 to the voltage source.

The operation of the tank 10 according to the invention is as follows.

When the sensor 27 detects a temperature of the urea solution higher than the preset maximum threshold, the control unit activates the conditioning device 20 in order to remove heat from the urea solution.

In greater detail, the control unit activates the voltage across the plates 22, 24 of the Peltier cell 21, each of which respectively, thanks to the so-called Peltier effect, cools and heats, thus removing heat from the urea solution. This action is maintained as long as the temperature of the urea solution inside the tank 10 does not fall below the preset maximum threshold temperature or, preferably, to a temperature range several degrees below it.

By reversing the polarity of the voltage acting on the ends of the Peltier cell 21 it is also possible to heat the urea solution contained inside the tank 10.

In this case, when the sensor 27 detects a temperature of the urea solution lower than the preset minimum threshold, the control unit activates the conditioning device 20 in order to supply heat to the urea solution.

In greater detail, the control unit activates the voltage (having a reverse polarity with respect to the case described above) at the ends of the plates 22, 24 of the Peltier cell 21, each of which, thanks to the known Peltier effect, is respectively heated and cooled, thus supplying heat to the urea solution.

This action is maintained as long as the temperature of the urea solution inside the tank 10 is not above the preset minimum threshold temperature.

When heating the urea solution, it is also possible to combine the operation of the conditioning device 20 with a urea intake unit 16 of known type. For example, the control unit could activate the conditioning device 20 and, only if the temperature of the urea solution fell again below the preset minimum temperature level, the control unit would further heat it by means of the urea intake unit 16, which is considerably more capable to heat the urea solution. For example, the urea intake unit 16 is fluidically connected to a cooling circuit of an engine of the vehicle 1 and the urea intake unit 16 can be activated to heat said urea solution when the temperature of said urea solution falls below said minimum threshold despite said conditioning device 20 having been activated to heat said urea solution.

From the foregoing, the advantages of a tank 10 for urea solution according to the invention are clear.

The conditioning device 20 allows maintaining the urea solution contained inside the tank 10 within a controlled temperature range in order to prevent the chemical disintegration of the urea and its freezing in a simple and inexpensive way, unlike known type conditioning circuits that are typically configured only to prevent any freezing of the urea solution.

The fact that the conditioning device 20 generates a heat flow by converting an electric power supply, in particular through at least one Peltier cell, makes the device simple and easy to use and maintain. It is also easy to position the device 20 on any wall of the tank.

The use of a Peltier cell also allows, simply by reversing the polarity of the electric power supply, passing from heating to cooling the urea solution in an extremely simple way.

Thanks to the control unit and to the sensor 27 it is possible to automatically maintain the temperature of the urea solution in a preset temperature range.

Finally, it is clear that the tank 10 for urea solution according to the present invention can be subjected to modifications and variations, which however do not depart from the scope of protection defined by the claims.

For example, the shape of the tank 10 is clearly arbitrary, as well as the number and shape of the usable Peltier cells 21. Furthermore, the Peltier cell 21 could be externally fastened to the outer wall of the tank 10 and not be "integrated" therein as described above.

Moreover, the sensor 27 could be a urea concentration sensor and the control unit could be configured to correlate this concentration with a temperature of the urea solution to control the activation of the device 20.

It is also obvious that the heat dissipation means 25 could be absent or differently made, just as the intake unit 16 could be merely configured to remove/fill the urea into the tank but could not be suitable to heat the urea.

Finally, it is clear that the present tank can be mounted at any diesel engine. For example it can be mounted on a heavy vehicle, such as a work vehicle or an agricultural vehicle, on a train or can be simply coupled to an electric generator.

The invention claimed is:

1. A tank for a urea solution, said tank comprising:
at least one wall which is made of plastic defining a closed volume configured to contain said urea solution;
conditioning means configured to maintain said urea solution within a preset temperature range between a maximum threshold and a minimum threshold,
said conditioning means generating a heat flow adapted to maintain said urea solution within said temperature range by converting an electric power supply of said conditioning means;
wherein said conditioning means comprises at least one Peltier cell; said at least one Peltier cell comprises a first plate in contact with said at least one wall and a second plate connected to said first plate on the opposite side of a thermoelectric connection material; and
a urea solution intake unit fluidically connected to a cooling circuit of an engine of said vehicle, wherein said urea solution intake unit is configured to be activated to heat said incoming urea solution when the temperature of said urea solution falls below said minimum threshold despite said conditioning device having been activated to heat said urea solution;
wherein the first plate which is made of a conductive material is co-moulded to said at least one wall which is made of plastic defining one inner face of the tank positioned for contact with the urea solution.

2. The tank according to claim 1, characterized in that said at least one Peltier cell comprises heat dissipation means configured to avoid an overheating of said second plate.

3. The tank according to claim 2, characterized in that said heat dissipation means comprise at least one finned surface connected to said second plate.

4. The tank according to claim 3, characterized in that said heat dissipation means comprise ventilation means configured to favour the air passage through said finned surface.

5. The tank according to claim 1, characterized in that it comprises a sensor configured to measure a physical quantity of said urea solution contained in said tank and a control unit configured to receive the signals measured by said sensor and to control said conditioning means for adjusting the temperature of said urea solution when said measurement of said sensor exceeds a preset maximum and/or minimum threshold.

6. The tank according to claim 5, characterized in that said sensor is a temperature sensor.

7. The tank according to claim 6, characterized in that said control unit is the central control unit of said vehicle.

8. The tank according to claim 1, characterized in that said maximum threshold temperature ranges between 40° C. and 55° C.

9. The tank according to claim 1, characterized in that the value of said minimum threshold temperature is 5° C.

10. The tank according to claim 1, wherein the urea intake unit is mounted along an exterior of the tank.

11. The tank according to claim 1, wherein the first plate and the second plate are parallel to one another with a thermoelectric connection layer disposed between the first plate and the second plate.

12. A tank for a urea solution, said tank comprising:
at least one wall which is made of plastic defining a closed volume configured to contain said urea solution;
conditioning means configured to maintain said urea solution within a preset temperature range between a maximum threshold and a minimum threshold, said conditioning means generating a heat flow adapted to maintain said urea solution within said temperature range by converting an electric power supply of said conditioning means; wherein said conditioning means comprises at least one Peltier cell; said at least one Peltier cell comprises a first plate in contact with said at least one wall and
a second plate connected to said first plate on the opposite side of a thermoelectric connection material,
wherein the first plate which is made of a conductive material is co-moulded to said at least one wall which is made of plastic, and the first plate and said at least one wall are in a plane that is a parallel to a plane that contains the second plate.

* * * * *